M. H. WILEY.
MACHINE FOR CUTTING BUNGS.

No. 187,951. Patented Feb. 27, 1877.

Witnesses:
James D. Kay
R. C. Crenshaw

Inventor:
Moses H. Wiley
by Bakewell & Kerr
Attys

4 Sheets—Sheet 2.

M. H. WILEY.
MACHINE FOR CUTTING BUNGS.

No. 187,951.  Patented Feb. 27, 1877.

WITNESSES  
James D. Kay  
R. C. Wrenshall

INVENTOR  
Moses H. Wiley  
by Bakewell & Kerr  
Attys

4 Sheets—Sheet 3.

M. H. WILEY.
MACHINE FOR CUTTING BUNGS.

No. 187,951. Patented Feb. 27, 1877.

Witnesses
James D. Kay
R. C. Wrenshall

Inventor
Moses H. Wiley.
by Bakewell & Kerr
Attys.

4 Sheets—Sheet 4.

M. H. WILEY.
MACHINE FOR CUTTING BUNGS.

No. 187,951. Patented Feb. 27, 1877.

Attest:
James L. Kay
R. C. Armshaw

Inventor:
Moses H. Wiley
by Bakewell & Kerr
Attys

N. PETERS, PHOTO-LITHOGRAPHER, WASHINGTON, D. C.

UNITED STATES PATENT OFFICE.

MOSES H. WILEY, OF PITTSBURG, PENNSYLVANIA.

IMPROVEMENT IN MACHINES FOR CUTTING BUNGS.

Specification forming part of Letters Patent No. 187,951, dated February 27, 1877; application filed February 7, 1876.

*To all whom it may concern:*

Be it known that I, MOSES H. WILEY, of Pittsburg, in the county of Allegheny and State of Pennsylvania, have invented a new and useful Improvement in Machines for Cutting Bungs; and I do hereby declare the following to be a full, clear, and exact description thereof, reference being had to the accompanying drawing, forming a part of this specification, in which—

Figures 1, 2:
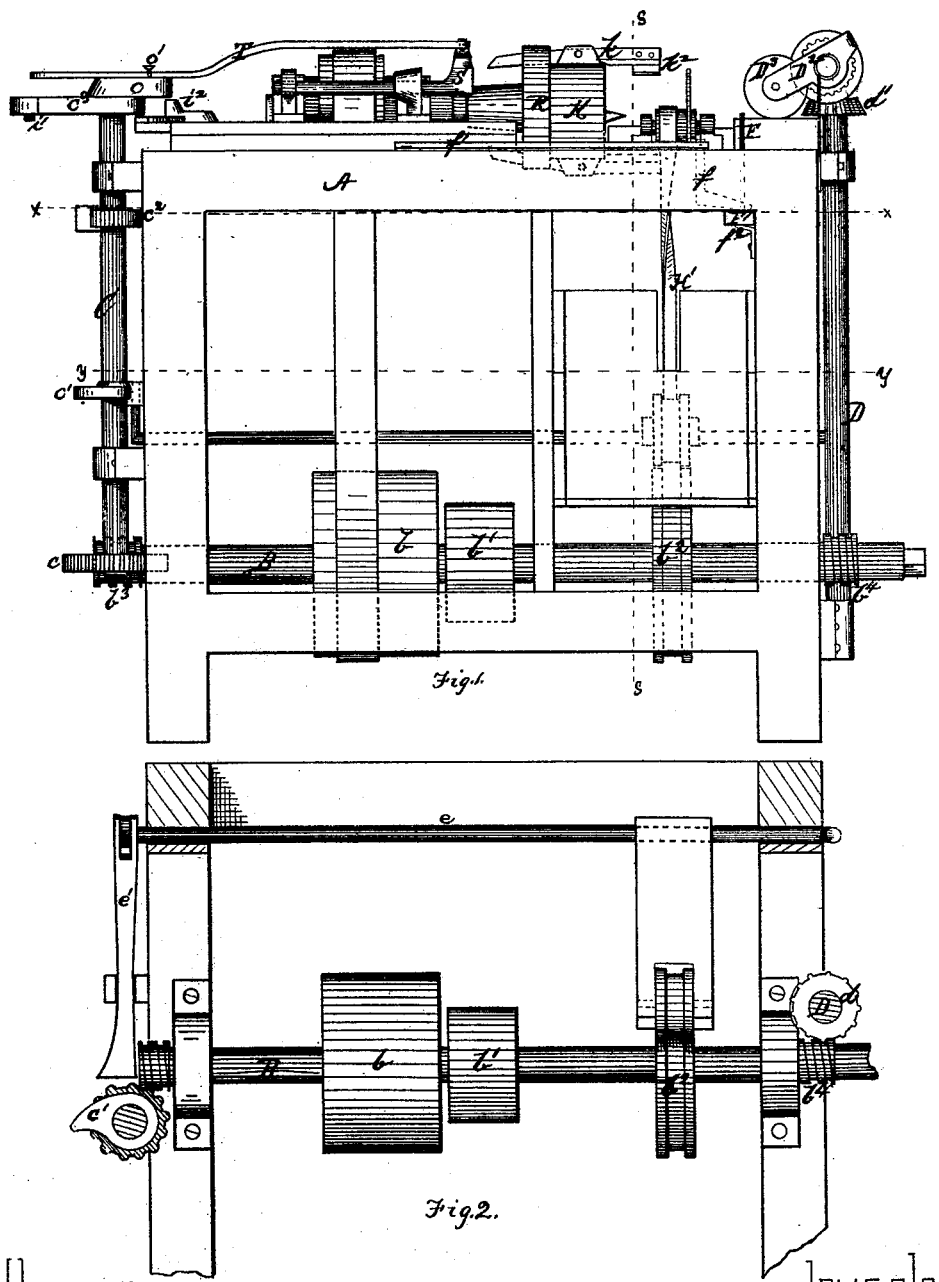
Figure 3:
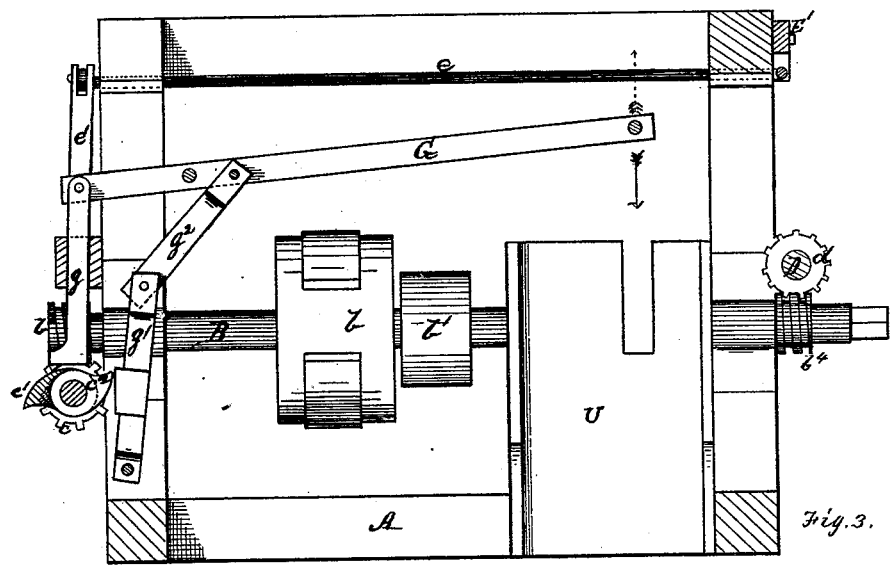
Figure 4:
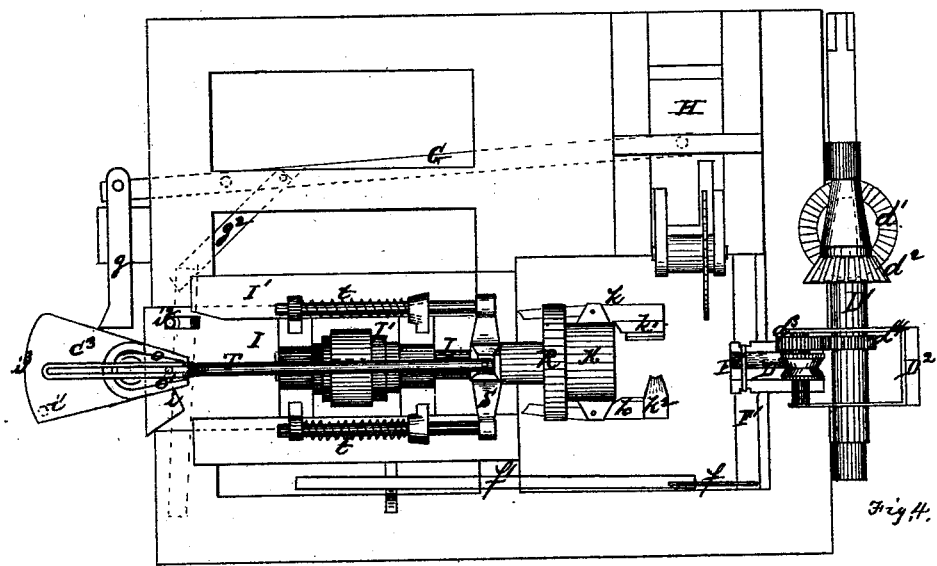
Figure 5:
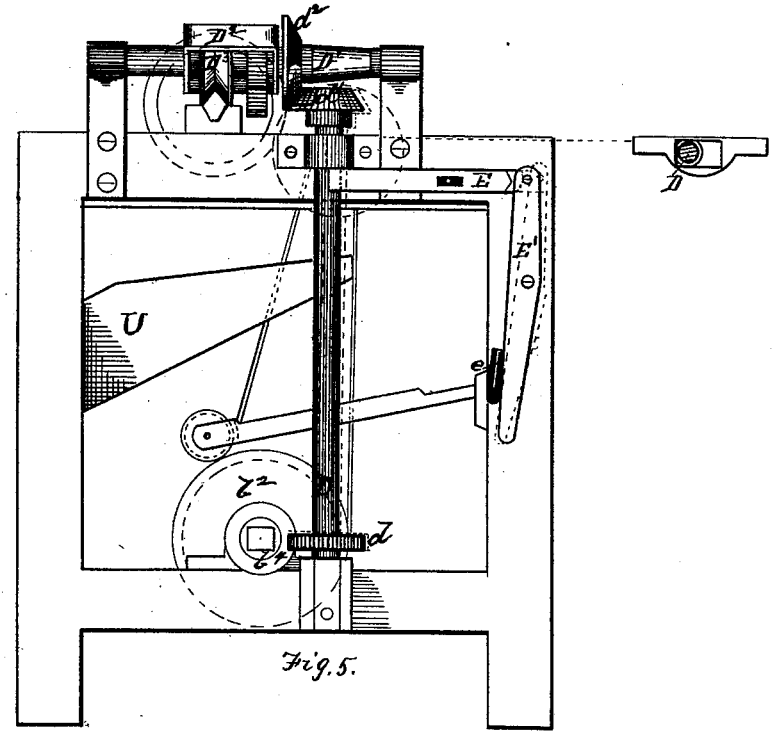
Figure 6:
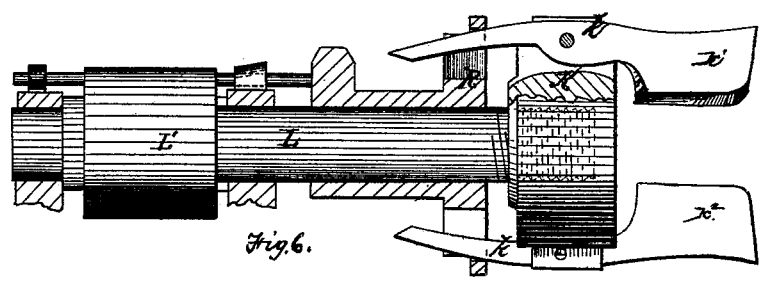
Figure 7:
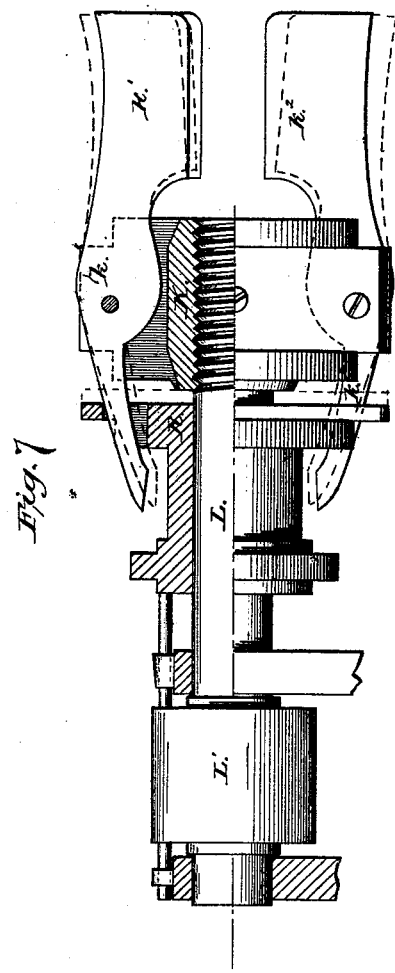

Figure 1 is a side elevation of a machine embodying my invention. Fig. 2 is a horizontal section on the line $y\,y$, showing the devices for feeding the material. Fig. 3 is a section on the line $x\,x$, showing the devices for operating the saw. Fig. 4 is a top plan view, showing the devices for operating the blade which tapers the bung. Fig. 5 is an end view of the machine, and Figs. 6 and 7 are detailed views, partly in section, of the head and slide of the tapering devices.

Like letters refer to like parts wherever they occur.

My invention relates to that class of machines employed for cutting and tapering bungs for beer-barrels and like purposes, and several of the devices and combinations are generally applicable in machinery employed for tapering and cutting lumber into lengths.

The invention consists, first, in so combining the tapering-tool or tapering and chamfering tools with the tool stock or head that, when released by the devices which force them against the material, they will be retracted and held out of the way by the centrifugal force; second, in combining with the tool-stock and the tapering-tool a sliding collar or its equivalent for forcing the tapering-tool against the material to be tapered; third, in combining with the tool-stock and its devices a sliding frame, actuated by a cam and a pitman or equivalent mechanism, for causing the advance and recession of the tool-head and for operating the tools thereof; fourth, in combining with the saw a sliding frame operated by a cam on the cam-shaft through the medium of elbow-levers, so as to cause the saw to travel in a plane at right angles to the tapering-tools, and to advance and recede at regular intervals; fifth, in combining with the devices for feeding the material to the cutters, shipping mechanism operated from the cam-shaft, so as to cause the material to be operated on to advance at regular intervals and remain stationary during the action of the cutters; and, finally, in details of construction hereinafter more specifically set forth.

I will now proceed to describe my invention so that others skilled in the art to which it appertains may make and use the same.

In the drawing, A indicates the frame for supporting the operative devices; B, the main power-shaft, provided with pulleys $b\ b^1\ b^2$ and with worms $b^3\ b^4$. C is a cam-shaft journaled on the main frame, and provided with a pinion, $c$, which gears with the worm $b^3$ of the shaft B. Upon this shaft C are cams—$c^1$ for shipping the feed devices, $c^2$ for causing the travel of the saw, and $c^3$ for operating the tool-stock. Journaled upon the opposite side of the main frame from the cam-shaft is a shaft, D, provided with a pinion, $d$, which gears with worm $b^4$ and a beveled pinion, $d^2$, upon shaft $D^1$ of the feed mechanism. The upper bearing of shaft D is such as to allow of sufficient play of the shaft to free the beveled pinion from the feed mechanism, the shaft being controlled by a series of pivoted levers, E $E^1$, rod $e$, and arm $e^1$, and which, with cam $c^1$, before specified, form the shipping mechanism of the feed devices. Upon shaft $D^1$ is a swinging housing, $D^2$, which carries the feed-roller $D^3$, which is operated by pinions $d^3$ and $d^4$, one fast on the shaft of the feed-roller, the other fast upon shaft $D^1$, the whole forming a feed mechanism which can adapt itself to irregularities and different-sized material.

F is a clamp or yoke placed over the feed-trough, and connected to a lever, F', operated from the sliding frame of the tool-stock through elbow-lever $f$ and rod $f^1$, so that the advance of the tapering-tool will draw down the yoke F and cause it to clamp and hold the material during the operation of the tapering-tools, the lever and yoke being raised by a spring, $f^2$, weight, or equivalent device, to release the material as soon as the tool retires, and the tapering operation has been performed.

G is a lever, pivoted to the under side of frame A, and connected by its long arm to the sliding frame H, on which is journaled the saw for cutting the bung from the strip.

On cam-shaft C, above the cam which operates the feed mechanism, is a second cam, $c^4$, which actuates a pivoted lever, G, first through a cam-rod, $g$, on the short arm of lever G, thereby causing the advance of the sliding frame and saw mounted thereon, and, secondly, through a compound lever, $g^1\ g^2$, pivoted to the long arm of lever G, causing the recession of sliding frame H.

The cam $c^4$ for operating the saw mechanism is arranged upon cam-shaft C, the reverse of the cam which operates the feed mechanism, so that the saw is always retracted from the line of the feed when the material to be operated upon is advancing, and the strip or material is stationary while the saw is advancing to sever the bung.

The saw is driven from the main shaft by a belt, H′, provided with suitable devices for taking up any slack due to the travel of the saw.

I will next describe the devices for tapering the bung. I is a sliding frame, moving in guides or ways I′ upon the main frame, and operated by the cam $c^3$ of cam-shaft C. Upon the rear of frame I is a cam, $i$, formed of a long and short incline, acting with a pin or projection, $i^1$, upon the under surface of cam $c^3$, and a pin or projection, $i^2$, which acts with the curved side $i^3$ of cam $c^3$. Cam $c^3$ is in the form of a sector, having a heel or projecting portion, $o$, upon which is a pin, $o^1$, for operating the slotted pitman or arm of the sliding collar R, the pin $o^1$ being on the opposite side of the center from the arc-face of the cam, which causes the advance of the sliding frame I, so that the collar R will be retracted to force the tapering-tools down upon the material at or about the time the forward movement of frame I is completed. The pins $i^1$ and $i^2$ may be provided with anti-friction rollers, if preferred.

Mounted in journals upon the sliding frame I is the shaft L of tool-stock, provided with pulley L′, by means of which it is driven.

K is the tool stock or head, which should be tapped and threaded, as shown, or otherwise formed, so that it can be moved forward or backward to vary the length of the bevel of the bung.

Pivoted to the tool-stock K are the arms or levers $k$, which carry the tapering and chamfering tools $k^1\ k^2$, said tools being slotted and secured by set-screws, so that they can be adjusted to produce bungs of varying diameters.

R is a sliding collar or cam-ring, which moves freely upon the shaft of the tool-stock, and is provided with a yoke, S, and pitman T, for operating the collar from the cam-shaft, and a spring, $t$, for holding the collar against the tool-stock K when released. This collar R is slotted for the passage of the bent arms of levers $k$, so that when the collar is retracted or drawn away from tool-stock K by its pitman T, the bent ends of the levers will be raised, and the opposite ends of the levers forced inward, carrying the tapering and chamfering tools against the material to be operated upon.

As soon as the collar is released the springs $t$ force the collar in contact with the stock K, and release the arms $k$, when the momentum of the revolving stock will retract the tools.

U is the usual spout for conducting off the bungs severed from the strip by the saw.

The feed may be varied by regulating the contact of cam $c^1$ and cam-arm $e^1$, as the feeding devices are only operative during the contact of the two. The diameter of the bung and taper thereof are regulated by adjusting the tool stock and blades, as before specified.

The operation of these devices is as follows: Motion being imparted from the main shaft to the cam-shaft, the latter is revolved until the cam $c^1$ strikes cam-arm $e^1$, rotating rod $e$, and operating the compound lever, causing the beveled pinion of shaft D to gear with the feed mechanism, and thus feed forward a strip of wood in the line of its fiber. At or about the same time the sector-cam $c^3$ causes the advance of the tool-stock K, which, when it reaches its full throw, checks and centers the strip of wood. The sliding frame I, actuating the yoke F, clamps and steadies the strip, and the cam $c^1$, escaping from cam-arm $e^1$, allows the feed mechanism to fall out of gear, while the collar R is retracted by its pitman T, forcing the tapering and chamfering tools down upon the material. During the time the arc of the sector-cam is in contact with pin $i^2$, the tool-stock is held forward and the tapering of the material takes place; but as soon as it has passed, the pin $i^1$ on the under face of the cam strikes the cam on the frame I and retracts the frame and tool-stock. At the same time the collar R is released, and is forced, by springs $t$, against the stock, thus releasing the tools, which are thrown back from the strip by the centrifugal force of the revolving head or stock K. At the instant the sliding frame I and tool-stock K mounted thereon have completed the backward movement, so as to be out of the way, the cam $c$ first actuates cam-rod $g$ and lever G, causing the advance of the saw and the severing of the bung from the strip, and then, striking the compound levers $g^1\ g^2$, produces the return movement of the saw. The cam $c^1$ again comes in contact with cam-arm $e^1$, and the several operations above specified are repeated.

The advantages derived from the construction specified are, first, the bung is formed from a continuous strip, the taper is with the fiber of the wood, and the fiber is parallel to the axis of the bung; secondly, the machine is compact and simple; and, finally, the bungs are more rapidly and perfectly formed than by any other machine known to me.

On a machine constructed in accordance with the above description I have been able to turn out one thousand bungs every hour, while the lathe-work runs about one hundred an hour.

I am aware that the tapering-tools have been pivoted to the revolving cutter-head and controlled by springs, and do not herein claim such a combination or subject-matter; but

Having thus described my invention, what I claim, and desire to secure by Letters Patent, is—

1. The combination of the revolving cutter-head and the pivoted tapering-tools, the tools being combined with, and connected to, the head, so as to be free to separate by centrifugal force when not confined by the sliding collar, substantially as specified.

2. The combination of the revolving tool-stock, the pivoted tapering tool or tools, and the sliding collar, substantially as and for the purpose specified.

3. The combination of the tool-stock, the pivoted tapering-tool and sliding collar, with the sliding frame, and the cam and pitman or similar mechanism for reciprocating the frame and operating the collar, substantially as and for the purpose specified.

4. The combination of the sliding saw-frame and saw mounted thereon, the cam, and the main and compound levers, substantially as specified.

5. The combination of the feed mechanism $D^2$ $D^3$ $d^3$ $d^4$, the cam $c^1$, and suitable intermediate mechanism for causing the feed to take place at regular intervals, substantially as specified.

6. The combination of the feed mechanism, the saw and tapering-tools mounted in sliding bearings, the cam-shaft provided with the series of cams and suitable intermediate mechanism, whereby the feeding forward of the strip and tapering and severing of the bung are accomplished in regular succession, substantially as specified.

In testimony whereof I, the said MOSES H. WILEY, have hereunto set my hand.

MOSES H. WILEY.

Witnesses:
F. W. RITTER, Jr.
JAMES I. KAY.